(12) United States Patent
Yamamoto (10) Patent No.: US 7,770,933 B2
(45) Date of Patent: Aug. 10, 2010

(54) PRINTING PAPER

(75) Inventor: Takemi Yamamoto, Nagoya (JP)

(73) Assignee: Lab. At-Site, Ltd., Nagoya (JP)

( * ) Notice: Subject to any disclaimer, the term of this patent is extended or adjusted under 35 U.S.C. 154(b) by 116 days.

(21) Appl. No.: 10/558,702

(22) PCT Filed: Jun. 1, 2004

(86) PCT No.: PCT/JP2004/007892

§ 371 (c)(1),
(2), (4) Date: Nov. 30, 2005

(87) PCT Pub. No.: WO2004/108422

PCT Pub. Date: Dec. 16, 2004

(65) Prior Publication Data

US 2006/0245804 A1    Nov. 2, 2006

(30) Foreign Application Priority Data

| Jun. 4, 2003 | (JP) | 2003-159915 |
| Jun. 4, 2003 | (JP) | 2003-159916 |
| Oct. 31, 2003 | (JP) | 2003-371970 |
| Jan. 26, 2004 | (JP) | 2004-017062 |
| Apr. 27, 2004 | (JP) | 2004-131278 |

(51) Int. Cl.
*B42D 17/00* (2006.01)
*B42D 3/00* (2006.01)
*B42D 7/00* (2006.01)
*B32B 9/00* (2006.01)
*B32B 33/00* (2006.01)

(52) U.S. Cl. .............. 281/46; 281/47; 281/48; 428/40.1; 428/42.2

(58) Field of Classification Search .............. 281/9, 281/12, 23, 26, 29, 35, 46–49; 493/396, 493/397, 399, 466; 428/40.1, 42.2, 42.3; 229/80; 40/638
See application file for complete search history.

(56) References Cited

U.S. PATENT DOCUMENTS 1,670,254 A * 5/1928 Gowin ............... 281/18
4,524,095 A * 6/1985 Gockel et al. ........ 428/43

(Continued)

FOREIGN PATENT DOCUMENTS

CN        2211358 Y    11/1995

(Continued)

*Primary Examiner*—Dana Ross
*Assistant Examiner*—Kyle Grabowski
(74) *Attorney, Agent, or Firm*—Oliff & Berridge, PLC (57) ABSTRACT

A printing paper includes a sheet having a first surface and a second surface, an adhesive layer formed on the second surface, a release paper attached to the adhesive layer, a plurality of boundary lines including first folding direction boundary lines and second folding direction boundary lines that divide the sheet into page regions, the release paper having a plurality of release-assist formation lines, wherein when folding along the first folding direction boundary line, first partial surfaces of adjacent page regions are brought together and when folding along the second folding direction line, second partial surfaces of adjacent page regions are brought together. When folding along the first folding direction boundary line, at least one tab portion of the release paper detaches from the adhesive layer and extends outward from the second surface, and the at least one tab portion enables removal of the release paper.

19 Claims, 12 Drawing Sheets

U.S. PATENT DOCUMENTS

| | | | | |
|---|---|---|---|---|
| 4,524,993 A * | 6/1985 | Walker-Taylor | .............. | 281/46 |
| 4,906,024 A * | 3/1990 | Lein | .............. | 281/5 |
| 5,582,298 A * | 12/1996 | Clayton et al. | .............. | 206/569 |
| 5,791,692 A * | 8/1998 | Manico et al. | .............. | 283/67 |
| 6,065,778 A * | 5/2000 | Dovel et al. | .............. | 281/5 |
| 6,068,423 A * | 5/2000 | Owen | .............. | 402/79 |
| 6,424,795 B1 | 7/2002 | Takahashi et al. | | |
| 6,742,809 B2 * | 6/2004 | Frosig et al. | .............. | 281/21.1 |
| 2004/0018330 A1 * | 1/2004 | McDonald | .............. | 428/43 |

FOREIGN PATENT DOCUMENTS

| | | |
|---|---|---|
| CN | 2261340 Y | 9/1997 |
| JP | 11-102194 | 4/1999 |
| JP | 2000-138941 | 5/2000 |
| JP | 2001-113776 | 4/2001 |
| JP | U-3079837 | 6/2001 |
| JP | 2003-078754 | 3/2003 |
| JP | 2003-099041 | 4/2003 |
| JP | 2003-140869 | 5/2003 |
| WO | WO 01/03431 A1 | 1/2001 |

\* cited by examiner

PRINTING PAPER

BACKGROUND

1. Field of Invention

This invention relates to a printing paper.

2. Background of Technology

The rise in popularity of digital cameras has led to an increase in the viewing and manipulation of image data on a personal computer. The image data can be saved to computer storage devices such as a hard disk drive or an optical disk drive. Further, the image data can be printed on a pasteboard or a printing paper using a printing device and bound to create a photo album. An album formed from image data printed directly onto a pasteboard or a printing paper provides more durability than a conventional photo album where printed images are adhered to sheets of the album.

However, there are various disadvantages associated with the conventional process by which a photo album formed of electronic images printed directly on a pasteboard or printing paper is formed.

In the conventional process, a vendor must be sought out to bind pasteboards or printing papers having image data printed thereon into a album. Further, there may be a significant delay in receiving the bound album from the vendor. Although an individual may print image data on printing paper and adhere the printed images to a ready-made album without the need for a vendor, such an album does not have the same professional appearance as an album formed by binding the printing images directly.

The printing paper of the present disclosure provides an advantage over conventional processes by allowing one to create a professionally bound album of images printed directly on printing paper without the need to seek the services of a vendor.

SUMMARY

Accordingly to one embodiment of the present disclosure, a printing paper comprises a sheet having a first surface and a second surface, an adhesive layer formed on the second surface, a release paper covering the adhesive layer, a plurality of boundary lines that divide the sheet into a plurality of page regions, the plurality of boundary lines including a plurality of first folding direction boundary lines and a plurality of second folding direction boundary lines, each of the plurality of page regions having a first partial surface that forms part of the first surface of the sheet and a second partial surface that forms part of the second surface of the sheet, the first partial surface capable of having an image printed thereon, the release paper having a plurality of release-assist formation lines created by forming a plurality of slits in the release paper such that each of the plurality of release-assist formation lines extends across one of the plurality of first folding direction boundary lines, wherein when folding along the first folding direction boundary line, the first partial surfaces of adjacent page regions are brought closer together and when folding along the second folding direction line, the second partial surfaces of adjacent page regions are brought closer together, wherein when folding along the first folding direction boundary line, at least one tab portion of the release paper formed along the release-assist formation line detaches from the adhesive layer and extends outward from the second surface of the sheet, and wherein the at least one tab portion enables removal of the release paper.

DETAILED DESCRIPTION OF EMBODIMENTS

Figure 1A:
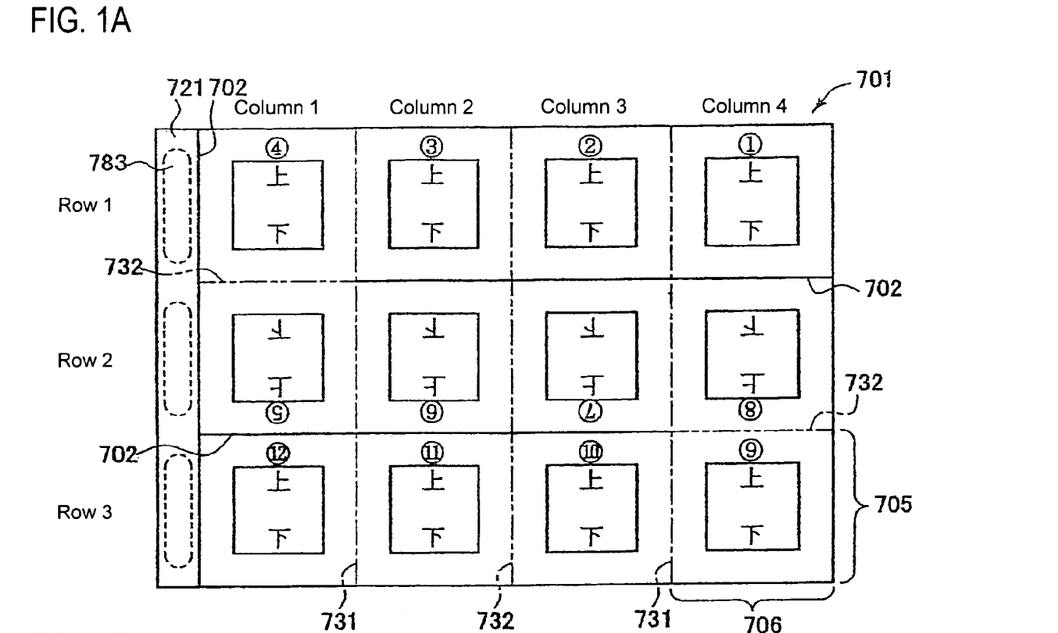
FIG. 1A is a plan view of a first surface of the printing paper according to a first embodiment.
Figure 1B:
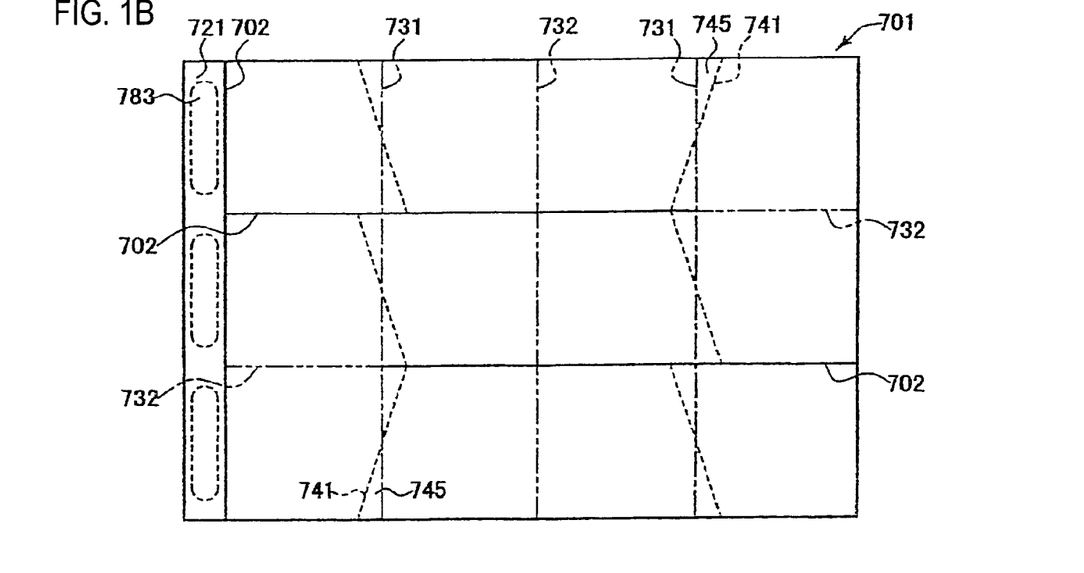
FIG. 1B is a plan view of a second surface of the printing paper according to the first embodiment.

FIG. 1A and FIG. 1B show an example of a printing paper in accordance with an embodiment of the present disclosure. FIG. 1A shows a front surface of printing paper 701. The printing paper includes a plurality of page regions, each page region being substantially the same size and having substantially the same shape, arranged in a matrix shape having three columns and four rows. The printing paper 701 includes a plurality of boundary lines that divide the printing paper 701 into the plurality of page regions, the plurality of boundary lines including separation boundary lines 702 shown as the solid line extending between page regions in the first row and page regions in the second row, from a leftmost edge column 2 to a rightmost edge of column 4, and the solid line extending between page regions in the second row and page regions in the third row, from a leftmost edge of column 1 to a rightmost edge of column 3. The printing paper 701 is cut along the separation boundary lines 702 such that at least one pair of adjacent page regions are separated each other. The plurality of boundary lines further includes a plurality of first folding direction boundary lines 731 and a plurality of second folding direction boundary lines 732.

Based on the numbering of the page regions shown in FIG. 1A (e.g. the page region at the row 1 and column 4 position being numbered "1," the page region at the row 1 and column 3 position being numbered "2," and so on), a first folding direction boundary line 731 is formed between page region 1 and page region 2 and a second folding direction boundary line 732 is formed between page region 2 and page region 3. The first folding direction boundary lines 731 and the second folding direction boundary lines 732 are formed alternately thereafter based on the numbering of the page regions. The numbering of the page regions is not intended to be limiting, and is shown merely to explain the positions of the first folding direction boundary lines 731 and the second folding direction boundary lines 732. Further, hereinafter, the first folding direction boundary lines 731 and the second folding direction boundary lines 732 are referred to as "Fold away from you" lines 731 and "Fold toward you" lines 732, respectively. Although an exemplary printing paper of the present disclosure may designate the first folding direction line as a "Fold away from you" line and the second folding direction line as a "Fold toward you" line, this terminology is not intended to be limiting and is used merely as a convenient way to refer to the boundary lines. The first folding direction boundary lines 731 and the second folding direction boundary lines 732 may be labeled on the printing paper in any manner.

Printing paper 701 may be an A4 size paper and may allow the printing of 12 images thereon. However, the printing paper 701 is not limited to this size and the number of images printed thereon is not limited to 12. Still referring to FIG. 1A, the images printed on the page regions in row 1 and the images printed on the page regions in row 3 have the same orientation, whereas images printed on the page regions in row 2 have an opposite orientation. A user may specify printer settings using an application software that causes the images to be printed in the orientation shown in FIG. 1A. The application software creates print data based on the specified printer settings, creates the appropriate set data, and sends the data to a printing device that prints the images in the correct orientation The orientation of images shown in FIG. 1A allows all of the images to be oriented in the same manner when the printing paper 701 is folded to form a photo booklet.

The page regions of the printing paper 701 each have a substantially square shape (i.e. a length of edges 705 and edges 706 are substantially the same). Residual region 721 which does not serve as a page region may also formed. Residual region 721 is formed in a label region 783 in which a title of the booklet or the like can be printed. Images are printed on the page regions and titles may optionally be printed on the label regions 783.

Figure 2:
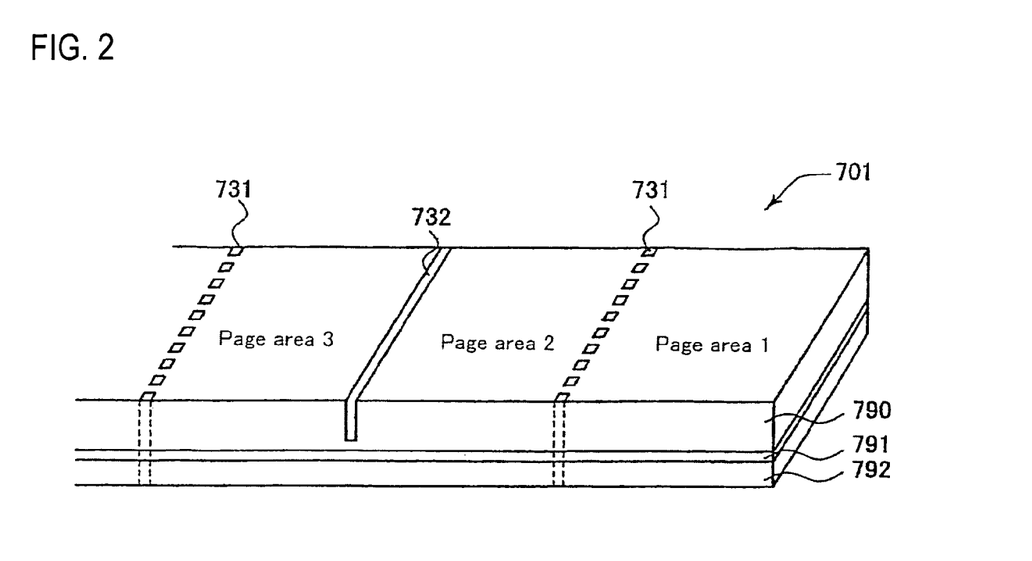
FIG. 2 is a perspective view of a printing paper according to embodiments of the present disclosure.

FIG. 2 shows a perspective view of the printing paper 701. Printing paper 701 comprises a sheet 790 having a first surface (i.e. top surface) and a second surface (i.e. bottom surface) and page regions, an adhesive layer 791 on the bottom surface thereof, and a release (i.e. stick & peel) paper 792 placed thereon. The top surface of the sheet 790 may have a glossy finish to ensure a fine finish of printing. It is preferable that the sheet 790 has a thickness of about 180 µm in order to produce high quality images. It is understood that FIG. 2 is not drawn to scale.

Still referring to FIG. 2, "Fold away from you" line 731 is a perforated line. "Fold toward you" line 732 is a half-slit that is formed by pressing an indentation in the sheet 790 to a depth of about 12 to about ⅔ of the total depth of the sheet 790. Thus, the sheet 790 remains connected at the residual depth that is not pressed and folding is facilitated. The "Fold away from you" line 731 may also be a half-slit rather than a perforated line. Alternately, the "Fold away from you" line 731 may be a micro-perforated line such that a photo booklet formed from the printing paper has a relatively large number of pages.

A relatively weak adhesive agent is preferable for use as the adhesive layer 791 so that the release paper 792 can be re-adhered to the adhesive layer 791 after removal. Specifically, if the sheet 790 has a base weight of 100 g/m$^2$ or more and a thickness of 180 µm or more, use of an adhesive agent having a tackiness of 12 N/25 mm or less allows peeling-off and re-adhesion of the release paper 792 if the page regions shift relative to each other when bonded together.

A bottom surface of the sheet of the printing paper 701 has an adhesive layer 790 formed thereon and a release (peel & stick) paper 792 covering the adhesive layer 790. Now referring to FIG. 1B, release paper 792 has a plurality of release-assist formation lines 741 formed therein. As shown in FIG. 1B, release-assist formation line 741 is formed by forming a slit in the release paper 792 that extends diagonally across the "Fold away from you" line 731. A tab portion 745 of the release paper 792 is formed by the formation of the release-assist formation line 741. The tab portion 745 has a substantially triangular shape that is bounded by a portion of the release-assist formation line 741, a portion of the "Fold away from you" line 731 and a portion of edges of the printing paper or the separation boundary line 702. Release-assist formation line 741 is a slit formed on release paper 792, and is not formed on sheet 790.

After images are printed on the top surface of sheet 790, the printing paper 701 is cut along the separation boundary lines 702. The portion expressed by a dotted line, which is the "Fold toward you" line, is not cut. The printing paper 701 is the folded alternately along the "Fold away from you" lines 731 and the "Fold toward you" lines 732 in order to form a photo booklet.

Figure 3A:
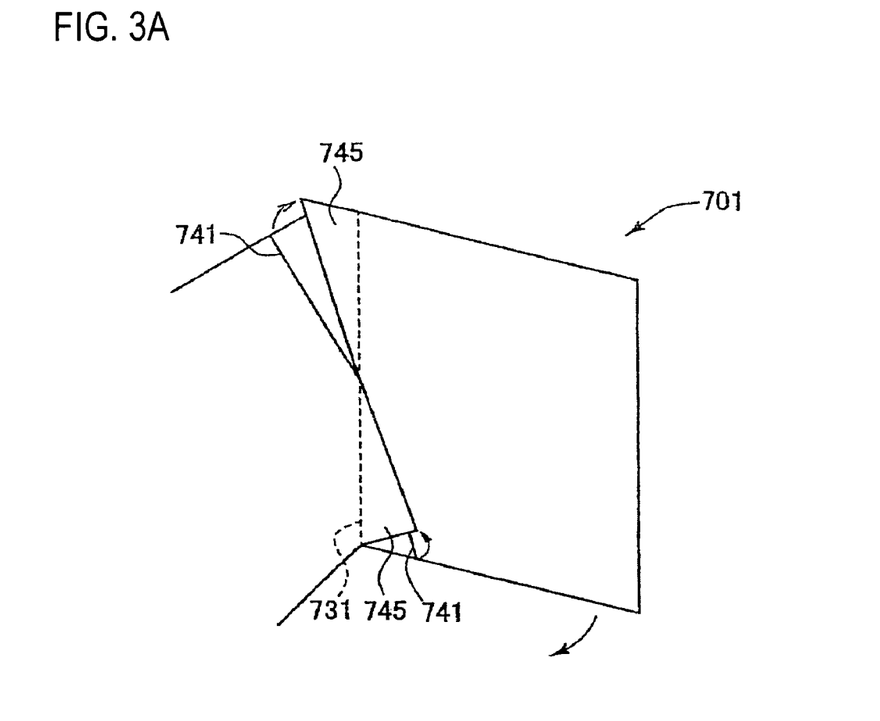
FIG. 3A is a view of tab portions of the release paper according to the first embodiment.
Figure 3B:
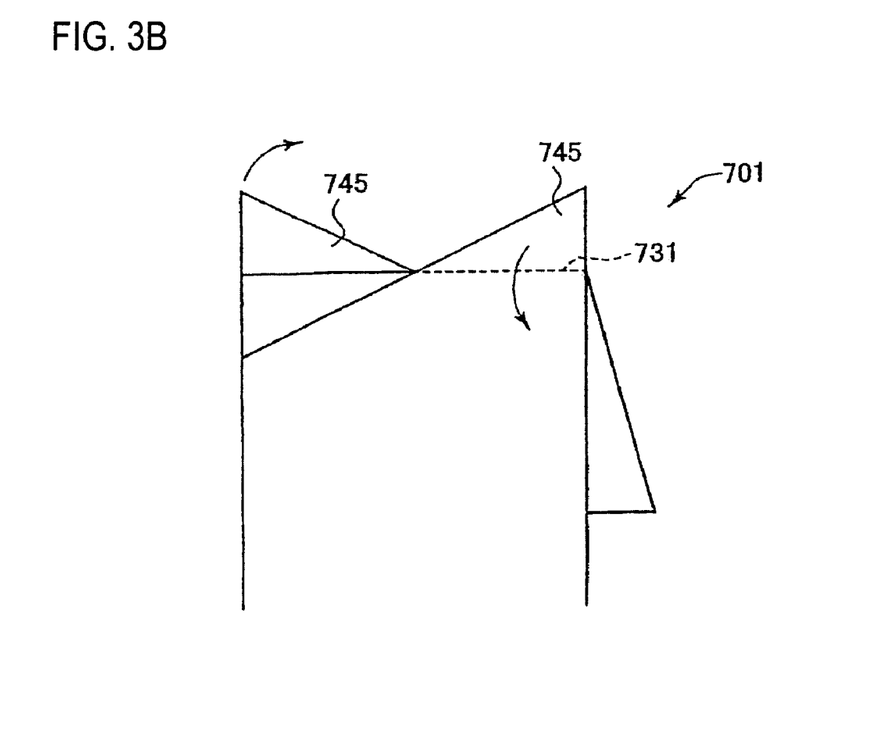
FIG. 3B is another view of tab portions of the release paper according to the first embodiment.

The process of peeling-off of the release (peel & stick) paper 792 for bonding of the printing paper will be explained referring to FIG. 3A and FIG. 3B. FIG. 3A shows a back surface of printing paper 701. Each of the plurality of page regions has a first partial surface that forms part of the top surface (i.e. first surface) of the sheet 790 and a second partial surface that forms part of the bottom surface (i.e. second surface) of the sheet 790 with the first partial surface capable of having an image printed thereon, The release paper 792 that covers the adhesive layer 791 that is formed on the bottom surface of the sheet 790 has formed therein release-assist formation line 741. As noted above, a tab portion 745 is formed by the formation of the release-assist formation line 741. When the printing paper is folded along the "Fold away from you" line 731, tab portion 745 of the release paper detaches from the adhesive layer 791 and extends outward from the bottom surface of the sheet 790 enabling the tab portion to be peeled off from the adhesive layer 791. Tab portion 745 can then be manipulated by fingers, and pulled in the direction indicated by the arrow shown in FIG. 3B, to thereby peel the release (peel & stick) paper 792 off. When the release paper 792 is removed by way of the tab portion 745, the second partial surfaces of adjacent page regions can be adhered together when folding along "Fold toward you" line 732.

Figure 4A:
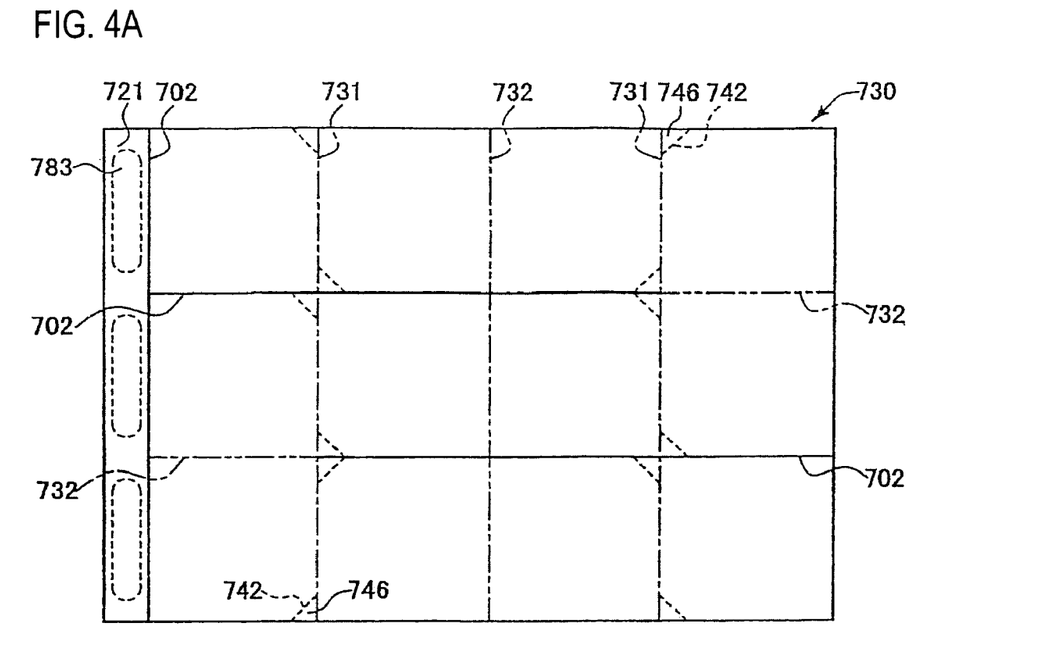
FIG. 4A is a plan view of a second surface of a printing paper according to a second embodiment.
Figure 4B:
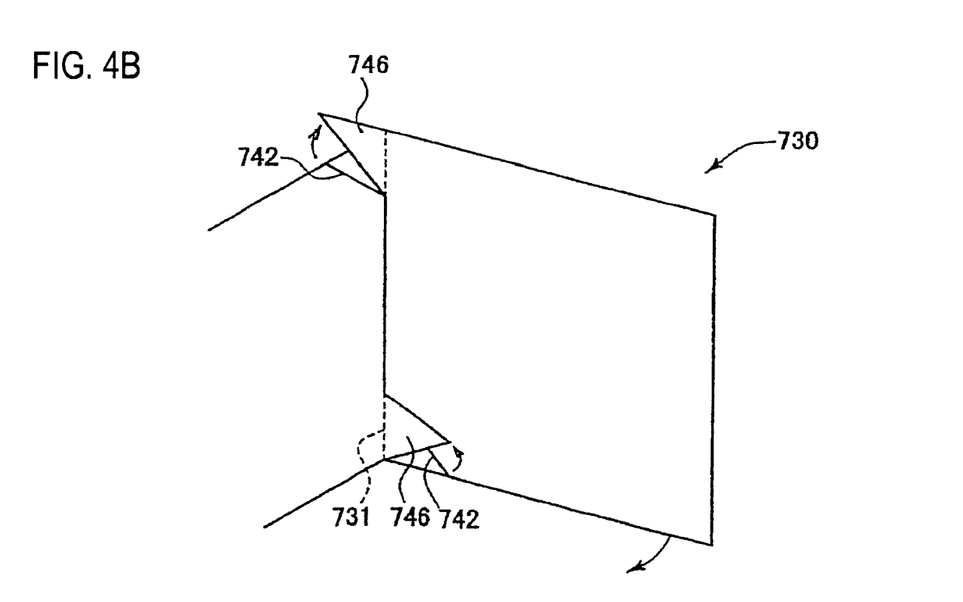
FIG. 4B is a view of tab portions detached from the second surface of the printing paper of the embodiment depicted in FIG. 4A.

FIG. 4A and FIG. 4B show examples of tab portions according to a second embodiment of the present disclosure. FIG. 4A shows the back surface of printing paper 730. A release-assist formation line 742 is formed by forming a slit in the release paper. A tab portion 746 having a substantially triangular shape is formed as a result of the formation of the release-assist formation line 742 and is bounded by the release-assist formation line 742, a portion of the "Fold away from you" line 731, and a portion of the separation boundary line 702 or an edge surface of the printing paper 730. By folding printing paper 730, along the "Fold away from you" line 731, tab portion 746 detaches from the adhesive layer and extends outward from the bottom surface of the sheet thereby enabling removal of the release (peel & stick) paper.

Figure 5A:
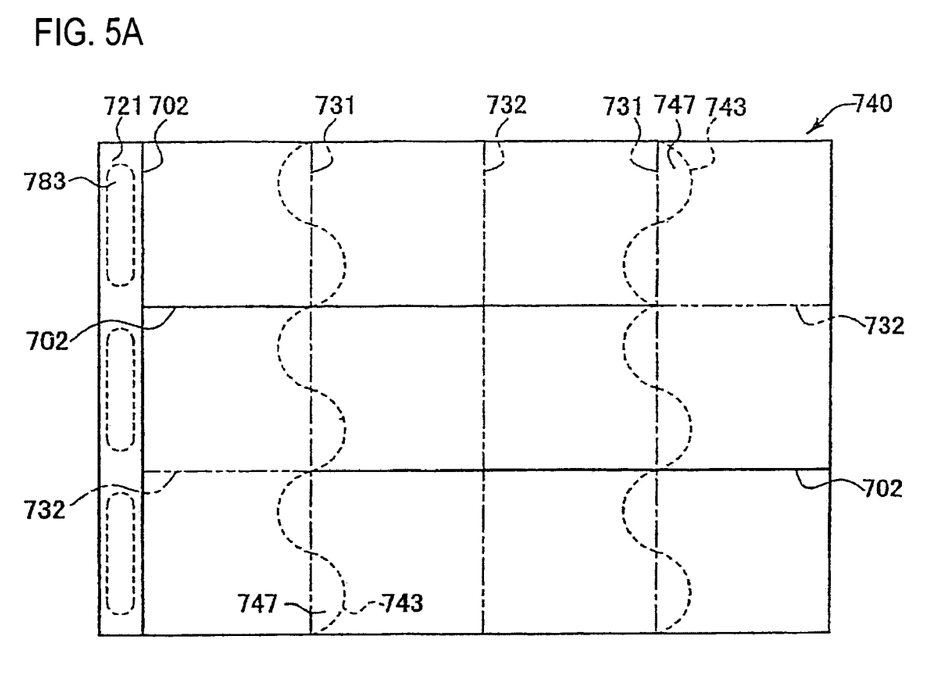
FIG. 5A is a plan view of a first surface of a printing paper according to a third embodiment.
Figure 5B:
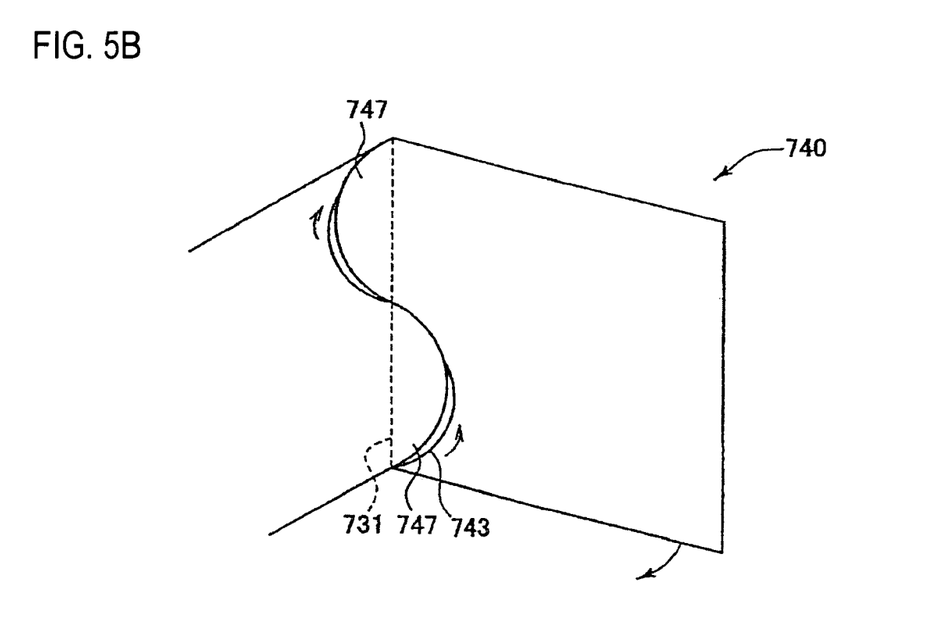
FIG. 5B is a view of tab portions of the printing paper depicted in FIG. 5A.

FIG. 5A and FIG. 5B show tab portions 747 according to a third embodiment of the present disclosure. A release-assist formation line 743 having a curved shape is formed in the release paper 792 such that the release-assist formation line 743 extends across the "Fold away from you" line 731. A tab portion 747 of the release paper 792 is formed as a result of the formation of the release-assist formation line 743, the tab portion having a substantially semi-circular shape. The tab portion 747 is bounded by a portion of the release-assist formation line 743 and a portion of the "Fold away from you" line 731. As shown in FIG. 5B, when folding printing paper 740 along the "Fold away from you" line 731, tab portion 747 is caused to detach from the adhesive layer and allows the release (peel & stick) paper 792 to be peeled off from the adhesive layer.

In each of the above-described embodiments, the tab portion is formed in the vicinity of the "Fold away from you line" 731 which allows the tab portion to be peeled off when the printing paper is folded at the "Fold away from you" line 731, because of the smallness of the area of the tab portion and the weakness of the tackiness of the tab portion. The shape of the tab portion is not limited to those in the embodiments described above. The tab portion may be any geometric shape that allows for the release paper to be peeled off from the adhesive layer upon folding of the printing paper. A tab portion with too large an area would have an adhesiveness strong enough to withstand the detaching force produced when folding along the "Fold away from you" line 731 and would not detach from the adhesive layer. It is also allowable, in place of forming the tab portion, to enclose an adhesive tape having a certain level of strength as a kit component, and to attach the adhesive tape to the release (peel & stick) paper in the vicinity of the folding line, and to pull the adhesive tape thereby peeling off the release (peel & stick) paper.

Figure 6:
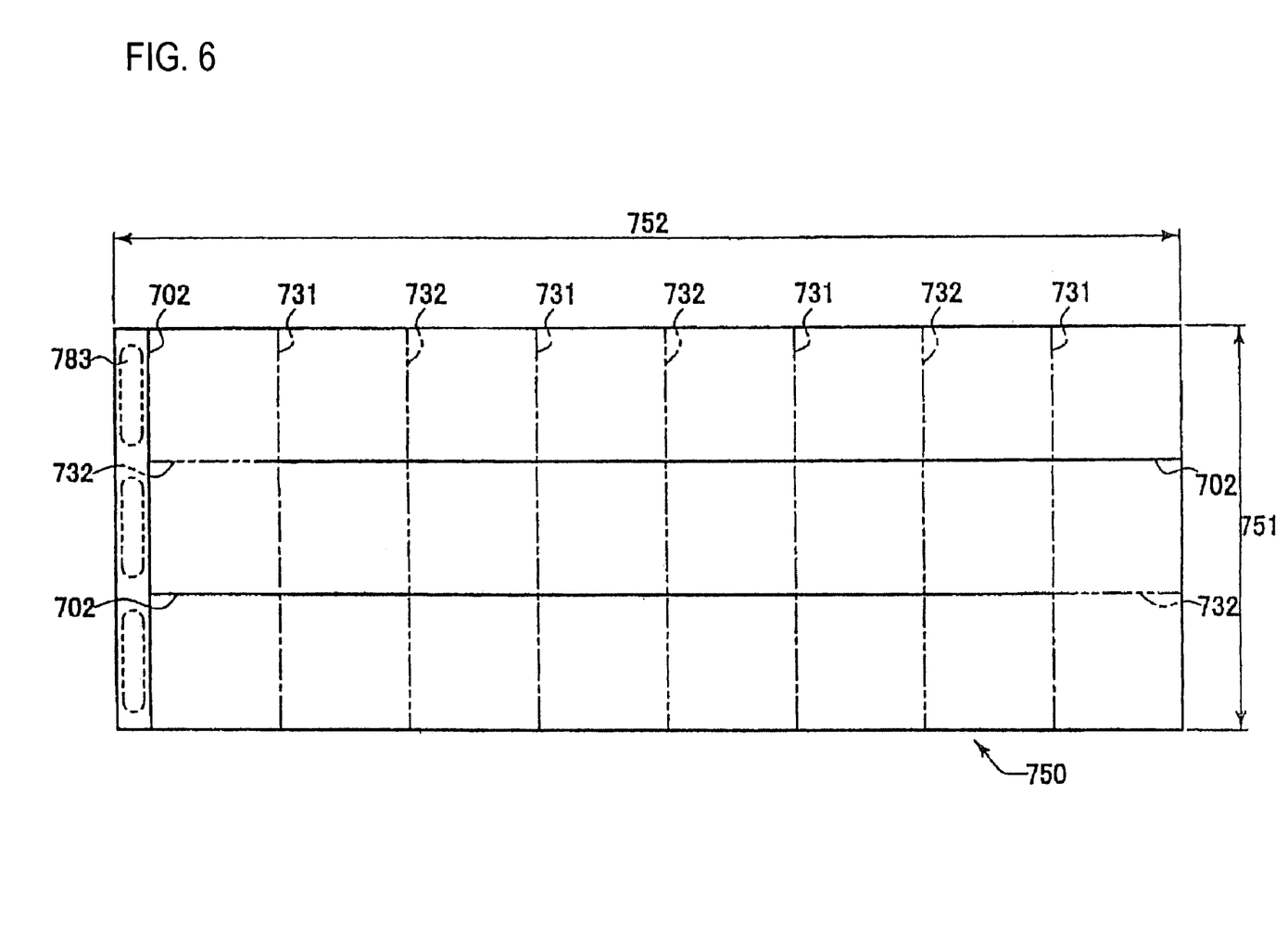
FIG. 6 is a plan view of a printing paper according to embodiments of the present disclosure.

FIG. 6 shows an example of printing paper comprising multiple A4 sized sheets of paper linked together. The paper has a width 751 of 210 mm, which is equal to the width of the A4-size paper. The length 752 is 594 mm, which is twice as long as the length of 297 mm of a single sheet of A4-size paper. Printing paper 750 has page regions of the same size arranged therein in three rows and eight columns. Similarly as described above, the printing paper comprises separation boundary lines 702, "Fold away from you" lines 731, "Fold toward you" lines 732 and label regions 783 such that the printing paper can be cut along the separation boundary lines 702 and folded alternately along the "Fold away from you" lines 731 and the "Fold toward you" lines 732 so as to form a booklet. Similarly as described above, the printing paper comprises a sheet whose bottom surface has an adhesive layer formed thereon. Because the printing paper has the same width as A4-sized paper, it can be printed on a general printer, thus allowing a large number of images to be printed.

Figure 7:
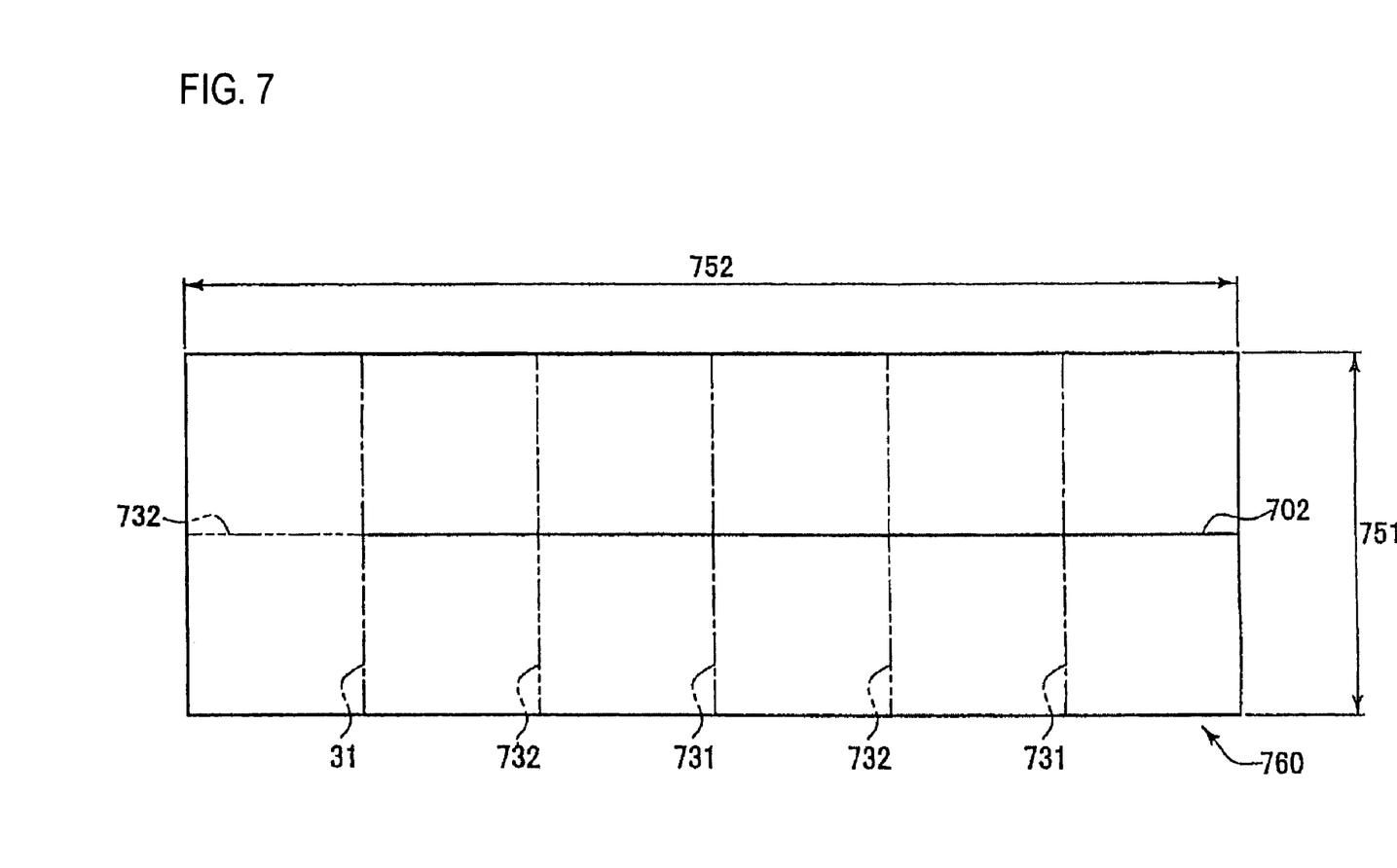
FIG. 7 is a plan view of a printing paper according to embodiments of the present disclosure.

FIG. 7 shows another example of a printing paper comprising multiple sheets of A4 sized paper linked together. The paper has a width of 751 which is equal to that of A4-sized paper, and a length 752 of 594 mm, which is double the length of A4-sized paper. Printing paper 750 has page regions of the same size arranged therein in two lines and six rows. This makes it possible to create a booklet larger than the booklet that is formed from the printing paper depicted in FIG. 6. The printing paper, having the same width as A4-sized paper, allows for printing to be done using a general printer.

Figure 8A:
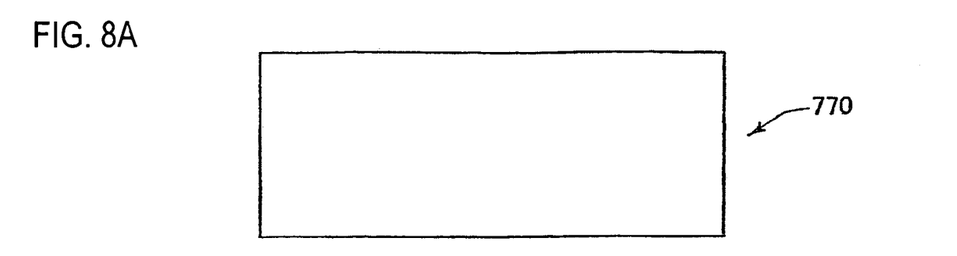
FIG. 8A is an explanation of a cover making process.
Figure 8B:
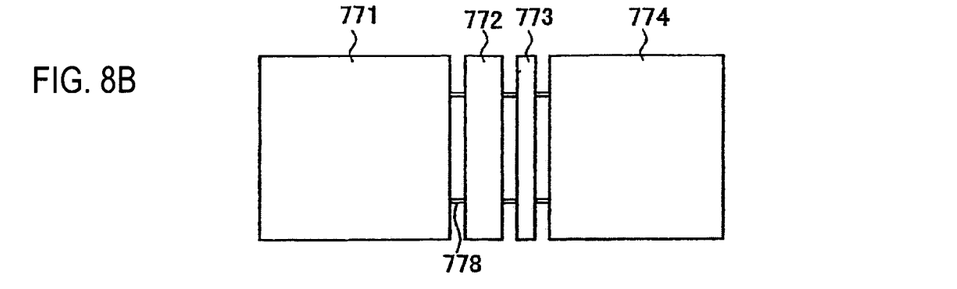
FIG. 8B is an explanation of a cover making process.

The creation process of the cover will be explained referring to FIG. 8A to FIG. 8D. Firstly, core element 770 composing the cover as shown in FIG. 8A, is obtained. Core element 770 may be composed of paper, plastic, wood, metal material or a similar material. The core element 770 is preferably a material having an intermediate hardness and is not limited to the materials listed above. As shown in FIG. 8B, a first cover component 771, a back cover component 772, an assist component 773, and a second cover component 774 are formed by removing sections of the core element 770. These four components are bound with each other by joint portions 778. This helps to avoid separation and to improve handling in the subsequent processes.

Figure 8C:
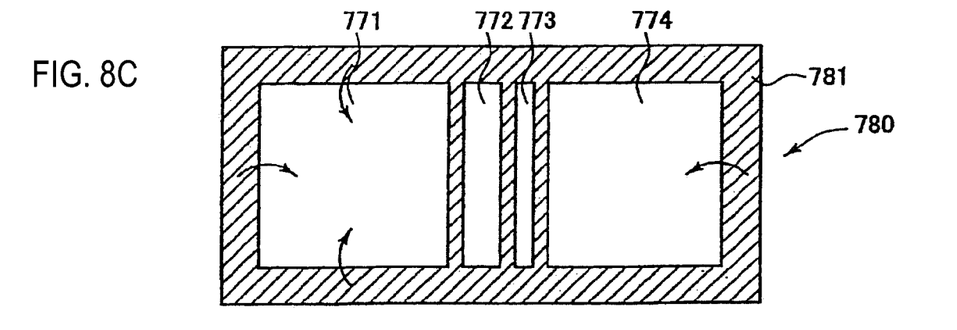
FIG. 8C is an explanation of a cover making process.
Figure 8D:
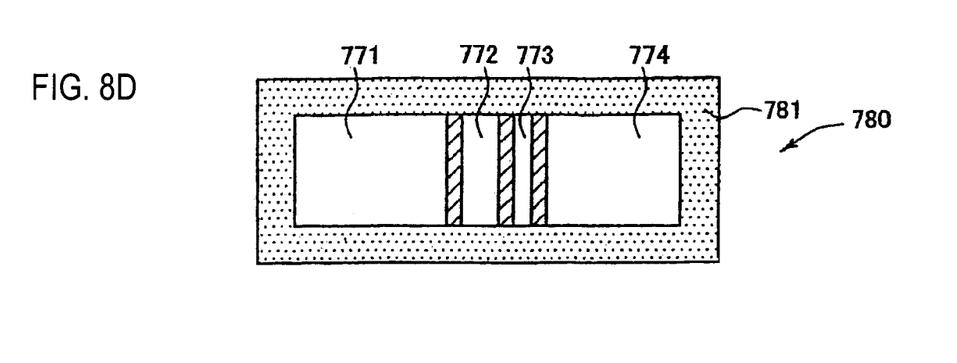
FIG. 8D is an explanation of a cover making process.

As shown in FIG. 8C, the first cover component 771, the back cover component 772, the assist component 773, and the second cover component 774 are placed on a cover 781. Cover 781 represents the outer covering of the finished booklet and can be decorated as desired. For example, a user's favorite colors or patterns can be used to decorate the cover 781. The cover 781 may comprise paper, vinyl resin, cloth, leather or a similar material. The four components formed in FIG. 8B are placed on an inner surface of the cover 781. As indicated by the arrows, the edge portions of cover 781 are folded, and attached to the four components. The joint portion 778 is detached as necessary. The cover is thus completed as shown in FIG. 8D.

Figure 9A:
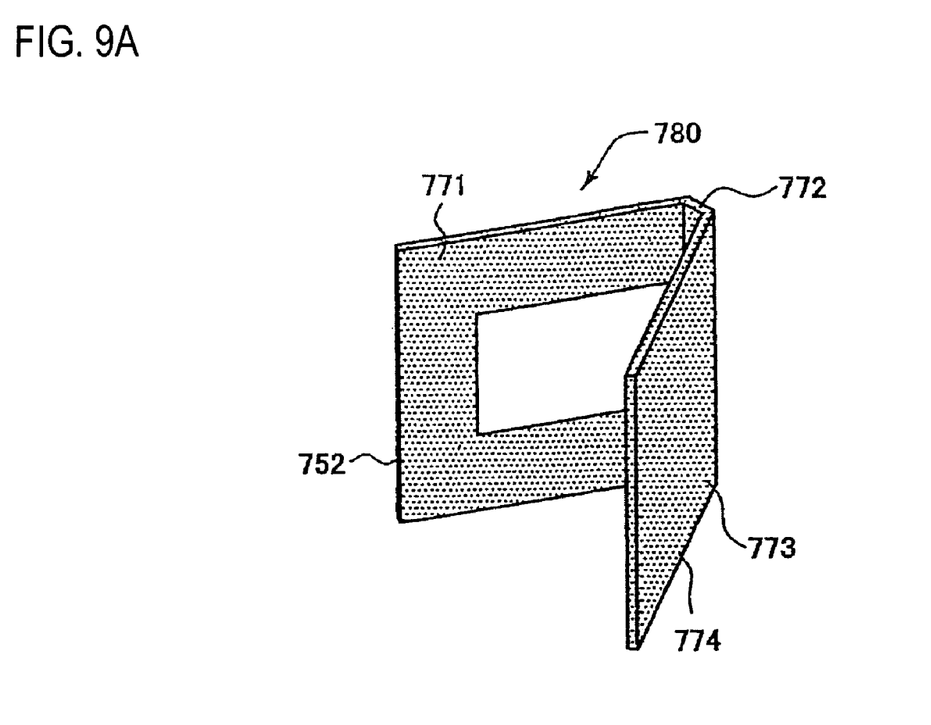
FIG. 9A is a side view of book cover.
Figure 9B:
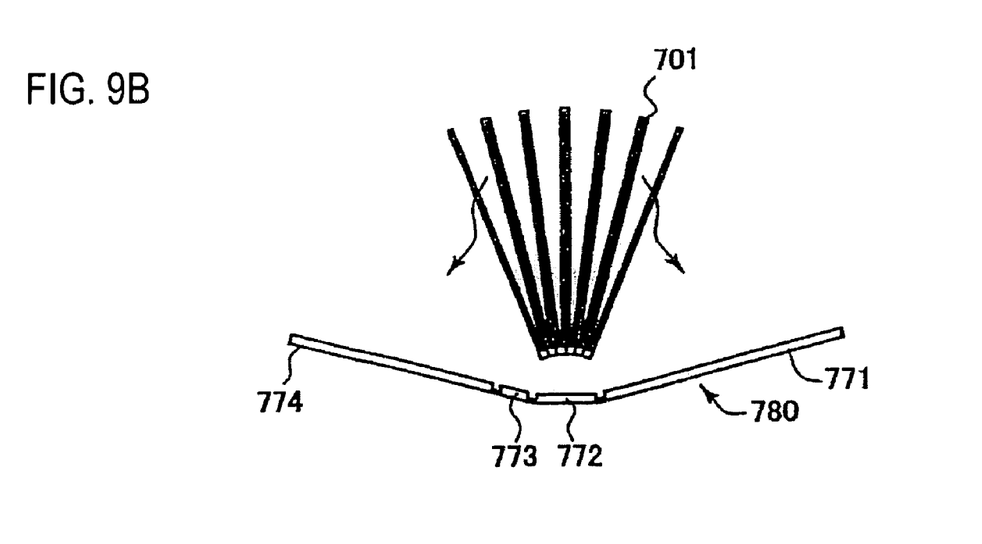
FIG. 9B is an explanation of bookmaking.
Figure 10A:
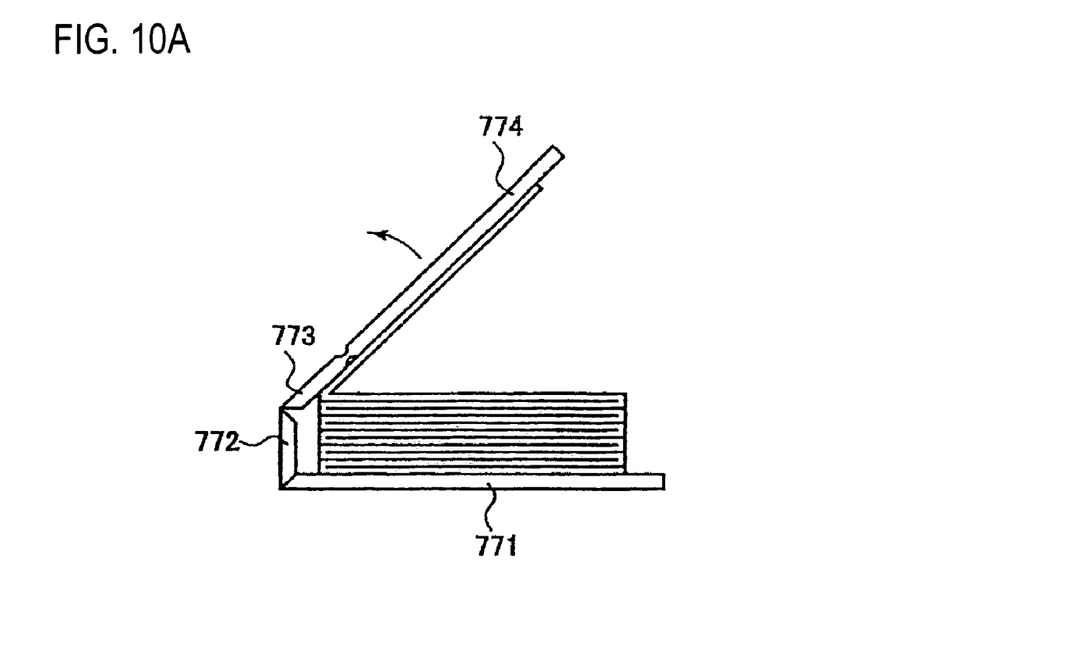
FIG. 10A is an explanation of book opening.
Figure 10B:
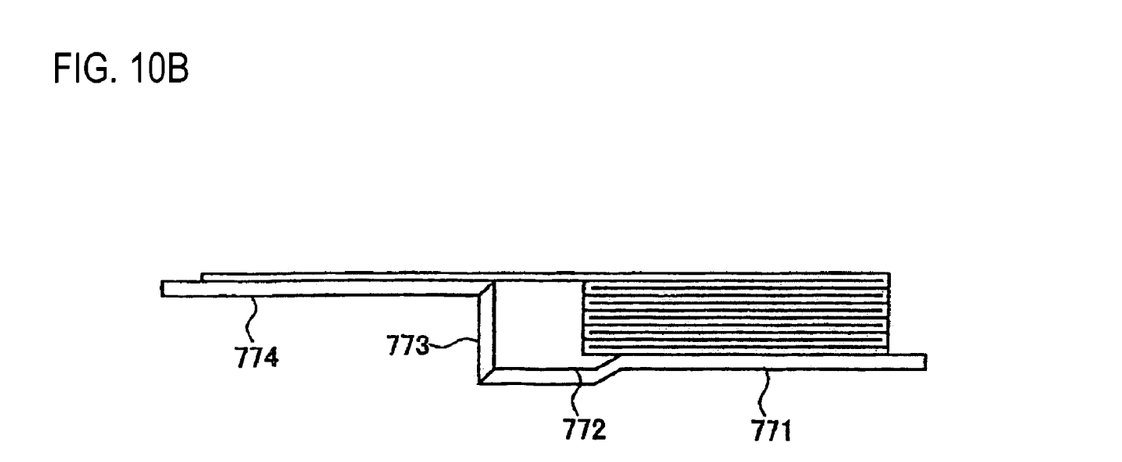
FIG. 10B is an explanation of book opening.

FIG. 9A shows a perspective view of the finished cover. The surface of cover 780 is covered with cover 781 which can be decorated as noted above. As shown in FIG. 9B, printing paper (fold section) 701 obtained by folding and bundling in the previous process steps is attached to cover 780. How to open the finished booklet will be described referring to FIG. 10A and FIG. 10B. As shown in FIG. 10A, opening from the second cover component 774 side, allows opposing edges of assist component 773 to fold, and this makes it possible to fully open the pages of the booklet.

Figure 11:
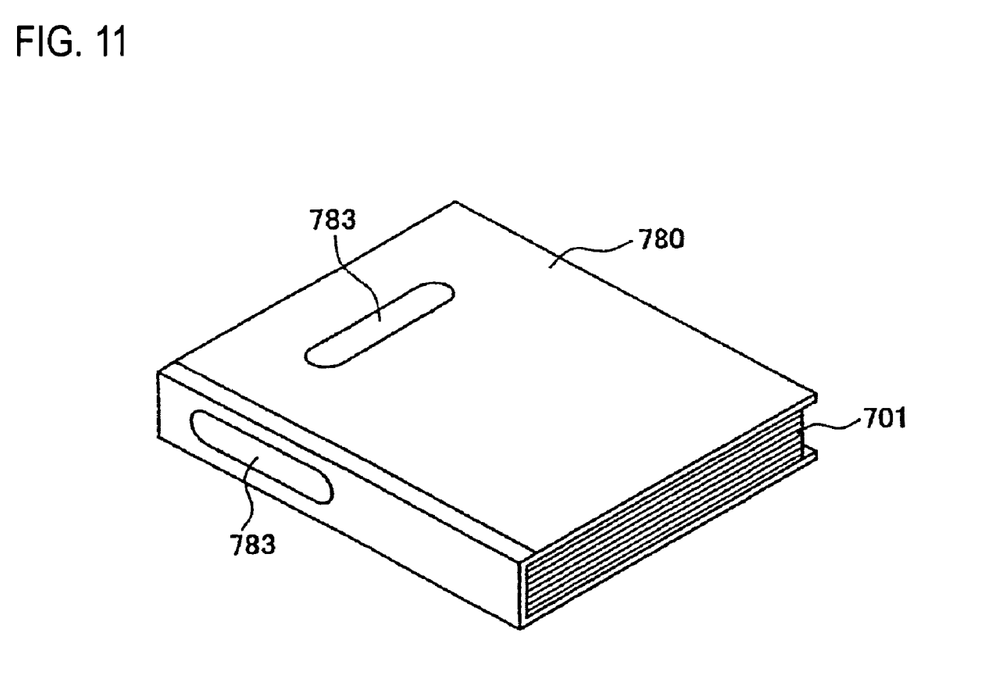
FIG. 11 is an explanation of labeling.

As shown in FIG. 11, label 783 formed in a part of printing paper 701 is then placed on the surface of cover 780 and the back cover. Label 783 has printed therein a title or other characters by which the booklet can be identified.

Figure 12A:
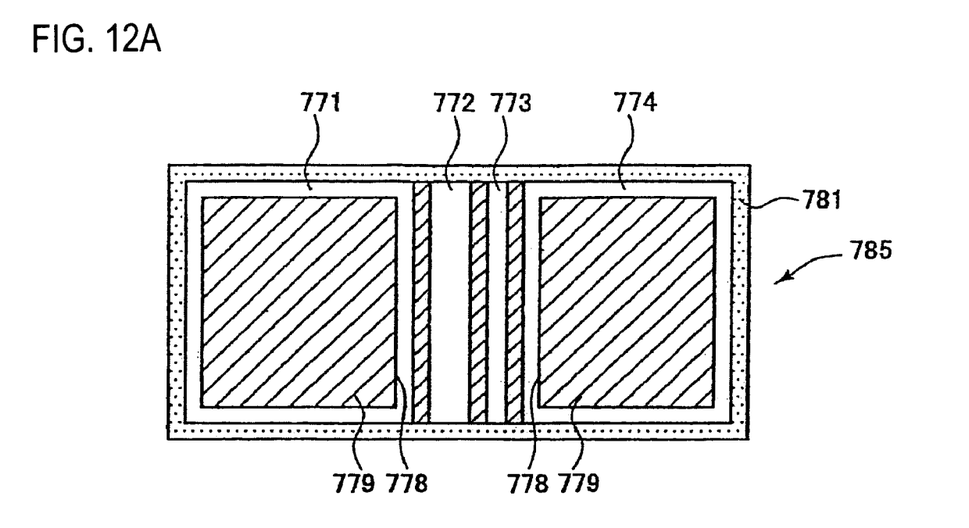
FIG. 12A is an explanation of a cover structure having a pocket.
Figure 12B:
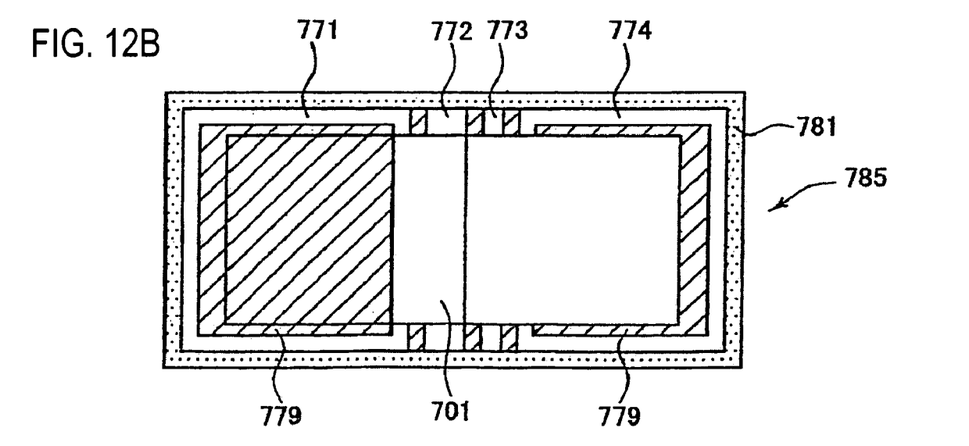
FIG. 12B is an Explanation of a cover structure having a pocket.

Another example of a cover in accordance with embodiments of the present disclosure is shown in FIG. 12A and FIG. 12B. As shown in FIG. 12A, first cover component 771 and second cover component 774 has an insertion bag 779 formed therein. The page insertion bag 779 has an opening 778 on one edge thereof, whereas three other edges are adhered to the first cover component 771 or the second cover component 774. As shown in FIG. 12B, the first page and the last page are inserted therein through openings 778, which thereby complete the booklet. The cover can readily be exchanged by virtue of a simple procedure of insertion of pages into insertion bag 779. The inserted pages are also made viewable if insertion bag 779 is formed using a transparent material. A vinyl resin can typically be used. Insertion bag 779 may be opaque for an exemplary cover where the first page has no printing therein.

Printing and folding of the printing paper having separation boundary lines and first folding direction and second folding direction boundary lines as described above makes it possible to readily and rapidly create the booklet. By forming the adhesive layer on the printing paper, and by forming the release-assist formation line on the release paper covering the adhesive layer, tab portions are formed that make it possible to readily peel off the release (peel & stick) paper, and adhere partial surfaces of page regions together to from a booklet which can then be attached to a cover. Because the cover is composed of the first cover component, the assist component, and the second cover component which are bound in an integrated manner while respectively placing a gap in between, the booklet is foldable at the individual gaps, and easy to open.

The invention claimed is:

1. A printing paper comprising:
a sheet having a first surface and a second surface;
an adhesive layer formed on the second surface;
a release paper attached to the adhesive layer;
a plurality of boundary lines that divide the sheet into a plurality of page regions, the plurality of boundary lines including a plurality of first folding direction boundary lines and a plurality of second folding direction boundary lines,
each of the plurality of page regions having a first partial surface that forms part of the first surface of the sheet and a second partial surface that forms part of the second surface of the sheet, the first partial surface being capable of having an image printed thereon,
the release paper having a plurality of release-assist formation lines created by forming a plurality of slits in the release paper such that each of the plurality of release-assist formation lines contacts one of the plurality of first folding direction boundary lines,
wherein:
when folding along one of the plurality of first folding direction boundary lines, the first partial surfaces of adjacent page regions are brought closer together and when folding along one of the plurality of second folding direction boundary lines, the second partial surfaces of adjacent page regions are brought closer together,
when folding along the first folding direction boundary line, at least one tab portion of the release paper formed as a result of the formation of the release-assist formation line detaches from the adhesive layer and extends outward from the second surface of the sheet,
the at least one tab portion enables removal of the release paper,
the at least one tab portion when detached from the adhesive layer enables removal of the release paper from the second partial surfaces of adjacent page regions such that the second partial surfaces are capable of being adhered together when folding along the second folding direction boundary line, and
the first folding direction boundary line is a perforated line having portions thereof that are penetrated through a depth of the printing paper,
pulling of the tab portion enables peeling off adjacent page regions, between the release-assist formation lines that contact the first folding direction boundary lines,
the adhesive layer on the second surface of the first page and last page are, after pulling of the tab portion, adhered to a booklet cover,
a process of folding along the boundary lines for creating a booklet makes the tab portion detach from the adhesive layer, and
a portion of the release paper formed on the back surfaces of two adjacent page regions is bounded by two first folding direction boundary lines that each contact a release-assist formation line, so that folding the printing paper along the two first folding direction boundary lines enables the portion of the release paper form on the back of the surfaces of the two adjacent page regions to be peeled without peeling any other portion of the release paper.

2. The printing paper of claim 1, wherein the plurality of boundary lines further includes at least one separation boundary line such that at least one pair of adjacent page regions are capable of being separated along the at least one separation boundary line.

3. The printing paper of claim 2, wherein the printing paper is separated along the at least one separation boundary line, folded along the plurality of first folding direction boundary lines such that the at least one tab portion is caused to extend from the second surface of the sheet, folded along the plurality of second folding direction boundary lines, the release paper being removed by way of the at least one tab portion and the second partial surfaces of adjacent page regions being adhered together, and the second partial surfaces of two of the plurality of page regions are adhered to a cover so as to form a booklet.

4. The printing paper of claim 3, wherein a title is printed on a region of the printing paper outside of a region formed by the plurality of page regions.

5. The printing paper of claim 3, wherein the printing paper is alternatively folded along the plurality of first folding direction boundary lines and the plurality of second folding direction boundary lines.

6. The printing paper of claim 2, wherein a single image is printed on the first partial surfaces of at least one pair of adjacent page regions.

7. The printing paper of claim 2, wherein each of the plurality of release-assist formation lines is a substantially straight line that extends diagonally across one of the plurality of first folding direction boundary lines.

8. The printing paper of claim 2, wherein the at least one tab portion has a substantially triangular shape and is bounded by a portion of the release-assist formation line, a portion of the first folding direction boundary line, and either a portion of the separation boundary line or a portion of an edge surface of the printing paper.

9. The printing paper of claim 3, wherein each of the plurality of release-assist formation lines has a curved shape and extends across one of the plurality of first folding direction boundary lines.

10. The printing paper of claim 9, wherein the at least one tab portion has a substantially semicircular shape and is bounded by a portion of the release-assist formation line and a portion of the first folding direction boundary line.

11. The printing paper of claim 3, wherein each of the plurality of release-assist formation lines do not extend across the one of the plurality of first folding direction boundary lines with which the release-assist formation line is in contact.

12. The printing paper of claim 11, wherein the at least one tab portion has a substantially triangular shape and is bounded by a portion of the release-assist formation line, a portion of the first folding direction boundary line, and either a portion of the separation boundary line or a portion of an edge surface of the printing paper.

13. The printing paper of claim 1, wherein each of the plurality of page regions has a substantially square shape.

14. The printing paper of claim 1, wherein the plurality of page regions are arranged in a matrix shape having a plurality of rows such that images printed on the first partial surfaces of page regions in one row are oriented in a direction opposite to a direction that images printed on the first partial surfaces of page regions in a row adjacent to the one row are oriented in.

15. The printing paper of claim 1, wherein folding along the first folding direction boundary line produces a force that causes the at least one tab portion of the release paper to detach from the adhesive layer.

16. The printing paper of claim 1, wherein an adhesive force between the at least one tab portion of the adhesive layer is less than a deforming force produced by folding along the first folding direction boundary line such that the at least one tab portion detaches from the adhesive layer and extends outward from the second surface of the sheet.

17. The printing paper of claim 1, wherein a tab of at least one of the release-assist formation lines connects to the adjacent release-assist formation line.

18. A printing paper comprising:

a sheet having a first surface and a second surface;

an adhesive layer formed on the second surface;

a release paper attached to the adhesive layer;

a plurality of boundary lines that divide the sheet into a plurality of page regions, the plurality of boundary lines including a plurality of first folding direction boundary lines and a plurality of second folding direction boundary lines, each of the plurality of page regions having a first partial surface that forms part of the first surface of the sheet and a second partial surface that forms part of the second surface of the sheet, the first partial surface being capable of having an image printed thereon, the release paper having a plurality of release-assist formation lines created by forming a plurality of slits in the release paper such that each of the plurality of release-assist formation lines contacts one of the plurality of first folding direction boundary lines, wherein:

when folding along one of the plurality of first folding direction boundary lines, the first partial surfaces of adjacent page regions are brought closer together and when folding along one of the plurality of second folding direction boundary lines, the second partial surfaces of adjacent page regions are brought closer together, when folding along the first folding direction boundary line, at least one tab portion of the release paper formed as a result of the formation of the release-assist formation line detaches from the adhesive layer and extends outward from the second surface of the sheet, the at least one tab portion enables removal of the release paper, the at least one tab portion when detached from the adhesive layer enables removal of the release paper from the second partial surfaces of adjacent page regions such that the second partial surfaces are capable of being adhered together when folding along the second folding direction boundary line, and the first folding direction boundary line is a perforated line having portions thereof that are penetrated through a depth of the printing paper and the second folding direction boundary line is a partially penetrated line that is penetrated to a depth less than a depth of the printing paper, pulling of the tab portion enables peeling off adjacent page regions, between the release-assist formation lines that contact the first folding direction boundary lines, the adhesive layer on the second surface of the first page and last page are, after pulling of the tab portion, attached to a booklet cover, a process of folding along the boundary lines for creating a booklet makes the tab portion detach from the adhesive layer, and a portion of the release paper formed on the back surfaces of two adjacent page regions is bounded by two first folding direction boundary lines that each contact a release-assist formation line, so that folding the printing paper along the two first folding direction boundary lines enables the portion of the release paper formed on the back of the surfaces of the two adjacent page regions to be peeled without peeling any other portion of the release paper.

19. The printing paper of claim 18, wherein a tab of at least one of the release-assist formation lines connects to the adjacent release-assist formation line.

* * * * *